United States Patent
Iwami et al.

(10) Patent No.: US 10,793,190 B2
(45) Date of Patent: Oct. 6, 2020

(54) ASSIST DEVICE FOR PULLING OUT OF PARKING SPOT

(71) Applicant: HONDA MOTOR CO., LTD., Minato-ku, Tokyo (JP)

(72) Inventors: Hiroshi Iwami, Wako (JP); Katsuhiro Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/328,863

(22) PCT Filed: Aug. 31, 2016

(86) PCT No.: PCT/JP2016/075402
§ 371 (c)(1),
(2) Date: Feb. 27, 2019

(87) PCT Pub. No.: WO2018/042530
PCT Pub. Date: Mar. 8, 2018

(65) Prior Publication Data
US 2019/0185055 A1    Jun. 20, 2019

(51) Int. Cl.
*B62D 15/02* (2006.01)
*G05D 1/02* (2020.01)
*B60W 30/06* (2006.01)
*B60W 10/20* (2006.01)

(52) U.S. Cl.
CPC ......... *B62D 15/0285* (2013.01); *B60W 30/06* (2013.01); *B62D 15/027* (2013.01);
(Continued)

(58) Field of Classification Search
CPC .................. B62D 15/0285; B62D 15/028; B62D 15/027; G05D 1/0212; G05D 1/0238;
(Continued)

(56) References Cited

U.S. PATENT DOCUMENTS

| | | |
|---|---|---|
| 5,587,938 A | 12/1996 | Hoetzel |
| 8,560,175 B2 | 10/2013 | Bammert et al. |

(Continued)

FOREIGN PATENT DOCUMENTS

| | | |
|---|---|---|
| JP | H07-234998 A | 9/1995 |
| JP | 2009-190531 A | 8/2009 |

(Continued)

OTHER PUBLICATIONS

International Search Report from International Application PCT/JP2016/075402 with the English translation thereof.

*Primary Examiner* — Dale W Hilgendorf
(74) *Attorney, Agent, or Firm* — Carrier Blackman & Associates, P.C.; Joseph P. Carrier; Jeffrey T. Gedeon

(57) ABSTRACT

This assist device for pulling out of a parking spot includes: an assist control unit for performing assist control to change the steering angle of a vehicle to a target steering angle; and a pulling out possibility determination unit for determining whether or not the vehicle can pull out on the basis of the detection result of a forward obstacle detected by forward detection unit. If it is determined that the vehicle can pull out, the assist control unit performs assist control to change the steering angle of the vehicle from the target steering angle to a neutral angle or a neutral vicinity angle.

7 Claims, 15 Drawing Sheets

(52) U.S. Cl.
CPC ......... *B62D 15/028* (2013.01); *G05D 1/0212* (2013.01); *B60W 10/20* (2013.01); *B60W 2420/42* (2013.01); *B60W 2420/52* (2013.01); *G05D 1/0231* (2013.01); *G05D 1/0238* (2013.01); *G05D 1/0255* (2013.01); *G05D 1/0257* (2013.01)

(58) Field of Classification Search
CPC .. G05D 1/0255; G05D 1/0257; G05D 1/0231; B60W 30/06; B60W 10/20; B60W 2420/42; B60W 2420/52
See application file for complete search history.

(56) References Cited

U.S. PATENT DOCUMENTS

| | | | |
|---|---|---|---|
| 9,481,368 | B2 | 11/2016 | Tomozawa et al. |
| 9,751,562 | B2 | 9/2017 | Yamashita et al. |
| 9,828,028 | B2 | 11/2017 | Ishijima et al. |
| 10,377,416 | B2 | 8/2019 | Fukukawa et al. |
| 2013/0144492 | A1* | 6/2013 | Takano et al. ..... B62D 15/0285 701/42 |
| 2016/0075331 | A1* | 3/2016 | Tomozawa et al. ......... B62D 15/028 701/41 |
| 2016/0107690 | A1* | 4/2016 | Oyama et al. ..... B62D 15/0285 701/41 |
| 2017/0297624 | A1* | 10/2017 | Noh ................... B62D 15/0285 |

FOREIGN PATENT DOCUMENTS

| | | |
|---|---|---|
| JP | 2011-518706 A | 6/2011 |
| JP | 2014-121984 A | 7/2014 |
| JP | 2016-060217 A | 4/2016 |
| JP | 2016-060222 A | 4/2016 |
| JP | 2016-060232 A | 4/2016 |
| JP | 5967305 B2 | 8/2016 |

\* cited by examiner

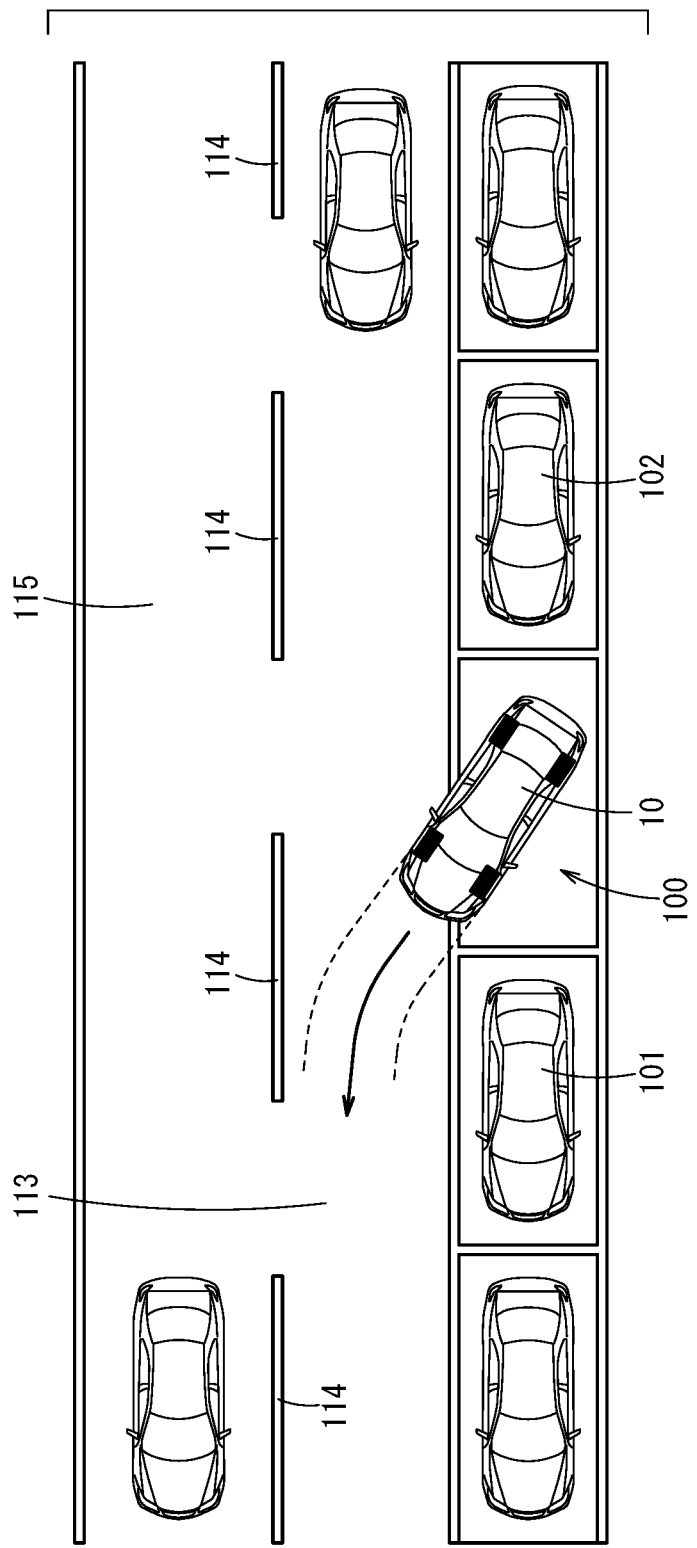

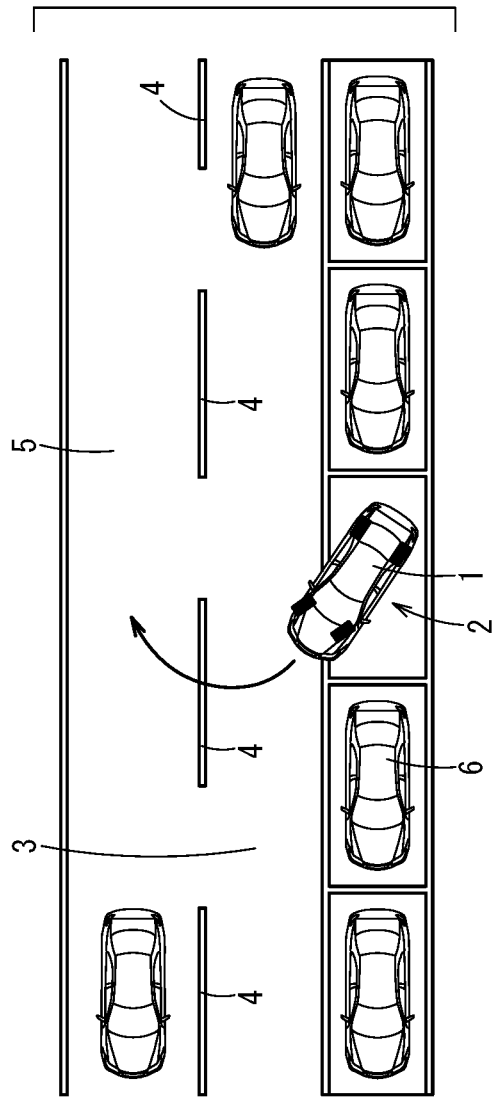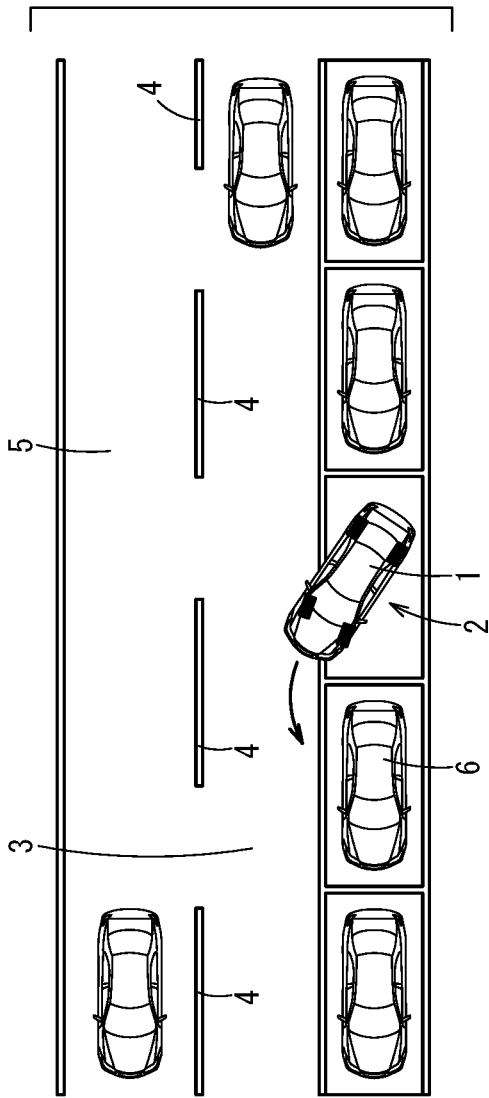
FIG. 15A
(COMPARATIVE EXAMPLE)
FIG. 15B
(COMPARATIVE EXAMPLE)

ASSIST DEVICE FOR PULLING OUT OF PARKING SPOT

TECHNICAL FIELD

The present invention relates to an assist device for pulling out of a parking spot (parking exit assist device for assisting a vehicle in pulling out of a parking spot).

BACKGROUND ART

A parking exit assist device that assists a vehicle in pulling out of a parking space has been known. For example, in the case of pulling out or exiting from a parallel parking space, a technology has been developed for assisting in turning back of a user's own vehicle, by performing a control to automatically change the steering angle of a vehicle (hereinafter referred to as a user's own vehicle or a host vehicle) which serves as an object that is exiting from parking.

In Japanese Laid-Open Patent Publication No. 2014-121984, a parking exit assist device is proposed in which, in the case it is determined that a user's own vehicle is capable of exiting from parking, an assist control is terminated after performing an increased-steering-angle control by increasing a target steering angle. According to the description therein, after the responsibility for driving has been handed over to the driver, even if a return associated with a steering characteristic occurs upon release of hands from the steering wheel, the target steering angle can be assured by an amount corresponding to the increased steering angle.

SUMMARY OF INVENTION

The apparatus proposed in Japanese Laid-Open Patent Publication No. 2014-121984, however, can cause the inconveniences described below when the driver attempts to pull out the vehicle still holding the steering wheel, that is, with an increased steering angle relative to the target steering angle.

As shown in FIG. 15A, a host vehicle 1 intends to pull out of a parallel parking space 2 and enter one driving lane 3. In this case, the current steering angle (hereinafter referred to as "steering angle") is increased clockwise relative to the target steering angle, so the host vehicle 1 starts traveling significantly steered to the right side with respect to the front direction. As a result, the host vehicle 1 may possibly drive into an opposite lane 5 across white broken lines 4.

In another example, as shown in FIG. 15B, the host vehicle 1 intends to pull out of the parallel parking space 2 and enter one driving lane 3. In this case, the steering angle is increased counterclockwise relative to the target steering angle, so the host vehicle 1 starts traveling steered to the left side with respect to the front direction. As a result, the host vehicle 1 may possibly contact another vehicle (a front vehicle 6) parked in front of the host vehicle 1.

The reason for the occurrence of these inconveniences is that the steering angle of the host vehicle at the completion of pulling out (that is, the final target steering angle) varies depending on the path traveled by the host vehicle since the start of the assist control. As described above, when the driver is not aware of the vehicle state with the increased steering angle, there is a problem that the host vehicle exhibits a behavior different from the sense of the driver.

The present invention has been made for solving this problem and an object thereof is to provide a parking exit assist device that enables the driver to correctly recognize the vehicle state after the assist control has ended and the responsibility for driving has been transferred to the driver, and that can ensure sufficient safety of driving after the host vehicle pulls out from a parking space.

A parking exit assist device according to the present invention includes: a front detection unit that detects at least a frontward distance from a host vehicle to a front obstacle present in front of the host vehicle; a target steering angle setting unit that sets a target steering angle of the host vehicle using the frontward distance detected by the front detection unit and a position of the host vehicle; an assist control unit that performs assist control in which a steering angle of the host vehicle is changed to the target steering angle set by the target steering angle setting unit; and an exit-from-parking possibility determination unit that determines whether exit of the host vehicle is possible or not based on a result of detection of the front obstacle by the front detection unit. When the exit-from-parking possibility determination unit determines that the exit of the host vehicle is possible, the assist control unit performs the assist control in which the steering angle of the host vehicle is changed from the target steering angle to a neutral angle or to a neutral neighboring angle in vicinity of the neutral angle.

In this manner, when it is determined that the host vehicle can pull out from a parking space, the assist control in which the steering angle of the host vehicle is changed from the target steering angle to the neutral angle or to a neutral neighboring angle in the vicinity of the neutral angle is performed. Thus, the driver can start driving from a steering angle that can be easily perceived as an initial state after completion of the exit from the parking space (that is, the neutral angle or the neutral neighboring angle). This enables the driver to correctly recognize the vehicle state after the assist control has ended and the responsibility for driving has been handed over to the driver, and can ensure sufficient safety after the host vehicle pulls out from the parking space.

When the target steering angle is an angle inclined on one side relative to the neutral angle, the assist control unit may perform the assist control in which the steering angle of the host vehicle is changed from the target steering angle to the neutral neighboring angle inclined on another side relative to the neutral angle. Given a return of the steering angle that can be caused by elastic deformation of tires or by backlash of a steering mechanism, the steering angle after being returned to the one side can be brought further closer to the neutral angle.

When a difference between the target steering angle and the neutral angle is equal to or smaller than a first threshold, the assist control unit may perform the assist control in which the steering angle of the host vehicle is not changed. It can be prevented that the steering angle from moving away from the neutral angle as a result of changing the steering angle.

When a difference between the target steering angle and the neutral angle is equal to or smaller than a first threshold, by automatic steering of a steering wheel, the assist control unit may perform the assist control in which the steering angle of the host vehicle is made to overshoot relative to the neutral neighboring angle from the target steering angle and is changed to the neutral angle thereafter. By presenting the driver with a series of operations for turning back the steering wheel to bring it back to the neutral angle (ending routine) even when a target steering angle close to the neutral angle is set, representation effect indicating the completion of assist control can be enhanced.

The assist control unit may perform the assist control in which the steering angle of the host vehicle is changed from the target steering angle to the neutral neighboring angle that is small relative to the target steering angle when a difference between the target steering angle and the neutral angle is equal to or greater than a second threshold, and the steering angle of the host vehicle is changed from the target steering angle to the neutral neighboring angle that is large relative to the target steering angle when the difference between the target steering angle and the neutral angle is below the second threshold. This makes the amount of change to the steering angle large relative to the target steering angle when the difference between the target steering angle and the neutral angle is small, and can lessen the influence of backlash.

When the neutral neighboring angle is larger than a third threshold, the assist control unit may further perform the assist control in which the steering angle of the host vehicle is changed from the neutral neighboring angle to the neutral angle. By additionally changing the steering angle in a direction parallel with the direction of backlash return, the steering angle can be returned to the neutral angle smoothly without causing the driver to feel a sense of unusualness.

The parking exit assist device may further include a notification unit that, after the steering angle of the host vehicle has been changed to the neutral angle or to the neutral neighboring angle by the assist control unit, notifies a driver of the host vehicle that exit of the host vehicle is possible. This enables the driver to recognize that the responsibility for driving has been handed over at an appropriate timing.

The parking exit assist device of the present invention enables the driver to correctly recognize the vehicle state after the assist control has ended and the responsibility for driving has been handed over to the driver, and can ensure sufficient safety of driving after the host vehicle pulls out from the parking space.

BRIEF DESCRIPTION OF DRAWINGS

FIG. 14 is a diagram showing the behavior of the host vehicle as pulling out after execution of steering angle neutralization control; and FIGS. 15A and 15B are diagrams showing the behavior of a host vehicle which is pulling out remaining in a state of increased steering relative to a target steering angle.

DESCRIPTION OF EMBODIMENTS

The parking exit assist device according to the present invention is described below by showing preferred embodiments thereof with reference to the accompanying drawings.

[Configuration of Parking Exit Assist Device 12]
<Configuration of Host Vehicle 10>

Figure 1:
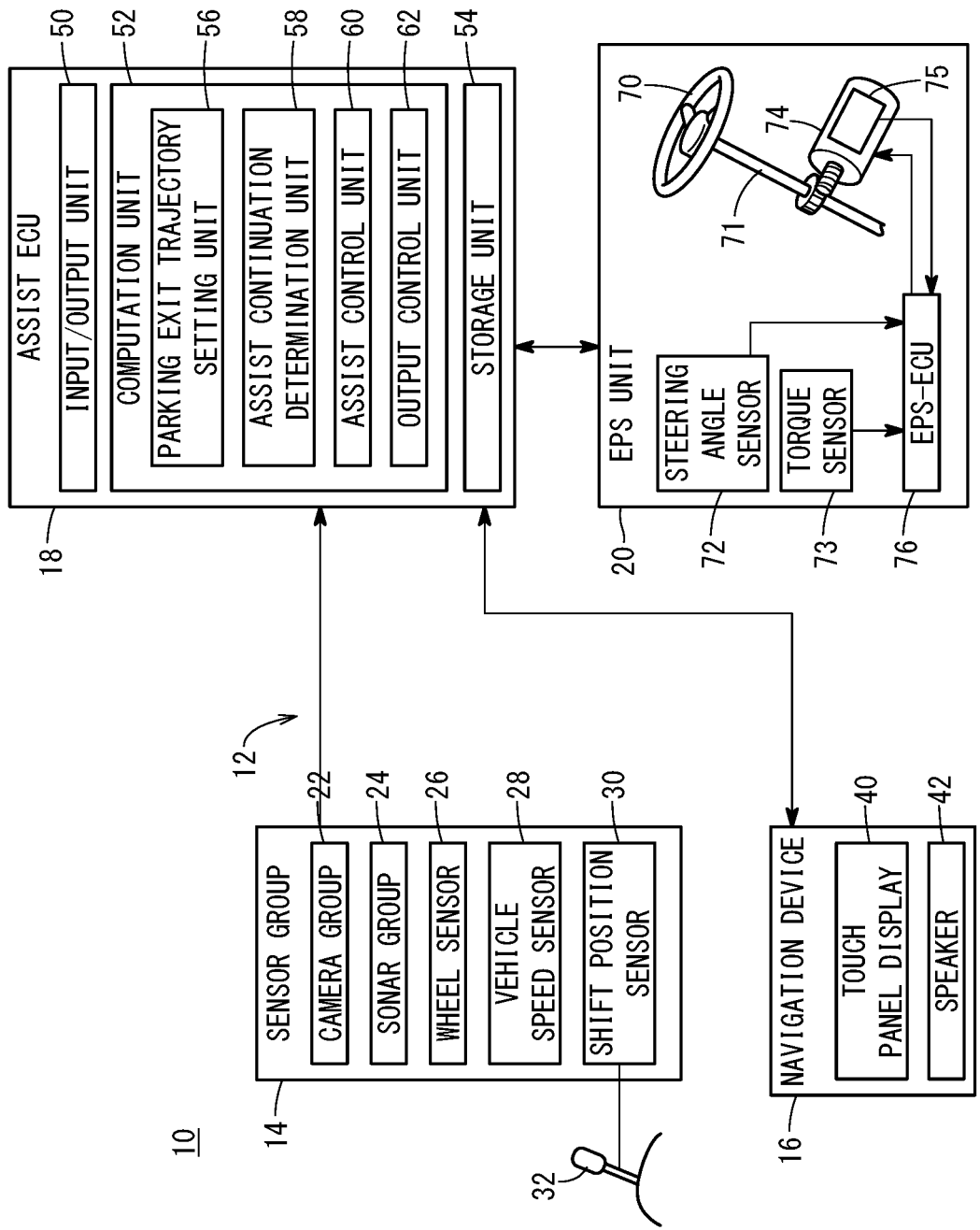
FIG. 1 is a block diagram showing a configuration of a host vehicle equipped with a parking exit assist device according to an embodiment of the present invention.

FIG. 1 is a block diagram showing a configuration of a vehicle (hereinafter referred to as a host vehicle 10) equipped with a parking exit assist device 12 according to an embodiment of the present invention.

The parking exit assist device 12 is a device that assists in pulling out the host vehicle 10 from a parking space in accordance with automatic steering by performing an assist control including a parking exit (PO; Pull Out) assist control. Here, the operation of a steering wheel 70 is automatically performed by the parking exit assist device 12, whereas the operation of an accelerator pedal and a brake pedal (both not shown) as well as a shift lever 32 is performed by the driver of the host vehicle 10.

The parking exit assist device 12 includes a sensor group 14 that detects various kinds of physical quantities used in assist control, a navigation device 16, an electronic control unit (ECU; hereinafter "assist ECU 18") that administers the assist control, and an electric power steering unit (hereinafter "EPS unit 20").

As shown in FIG. 1, the sensor group 14 includes a camera group 22, a sonar group 24, a wheel sensor 26, a vehicle speed sensor 28, and a shift position sensor 30.

The camera group 22 is made up from one or more cameras capable of taking images of the surrounding periphery of the host vehicle 10, and sequentially outputs imaging signals indicating peripheral images of the host vehicle 10. The sonar group 24 is made up from one or more sonar devices capable of emitting sound waves and receiving reflected sounds from other objects, and sequentially outputs detection signals correlated with a distance Dis from the host vehicle 10.

The wheel sensor 26 is an angle sensor or a displacement sensor that detects angles of rotation of the left and right front wheels and/or left and right rear wheels (none of which is shown) and outputs a number of detection pulses correlated with a travel distance of the host vehicle 10. The vehicle speed sensor 28 is a sensor that detects a speed of the host vehicle 10 (that is, vehicle speed), and configured to be able to detect the vehicle speed from, for example, an amount of rotation of a non-illustrated drive shaft of a transmission.

The shift position sensor 30 outputs a detection signal indicative of a shift position selected in accordance with the operation of the shift lever 32 (also called a selector). The shift lever 32 is a device that is capable of selecting any one type from among, for example, six types of shift positions: "P" (parking range), "R" (reverse range), "N" (neutral range), "D" (drive range), "2" (second range), and "L" (low range).

The navigation device 16 detects a current position Pc of the host vehicle 10 (FIG. 6) using a global positioning system (GPS) and guides the occupants including the driver along a route to a destination point. The navigation device 16 includes a touch panel display 40 (notification unit), a speaker 42 (notification unit), and a storage (not shown) in which a map information database is constructed. The navigation device 16 functions as a human-machine interface (HMI) on the parking exit assist device 12.

The assist ECU 18 includes as hardware components thereof an input/output unit 50, a computation unit 52, and a storage unit 54. The computation unit 52, by reading out and executing programs stored in the storage unit 54, functions as an exit-from-parking trajectory setting unit 56 (target steering angle setting unit), an assist continuation determination unit 58 (exit-from-parking possibility determination unit), an assist control unit 60 (assist control unit), and an output control unit 62 (display control unit).

The EPS unit 20 includes the steering wheel 70, a steering column 71, a steering angle sensor 72, a torque sensor 73, an EPS motor 74, a resolver 75, and an EPS-ECU 76.

The steering angle sensor 72 detects the steering angle (hereinafter steering angle $\theta$; see FIG. 8 and other diagrams) of the steering wheel 70. The torque sensor 73 detects a torque applied to the steering wheel 70. The EPS motor 74 applies a driving force or a reaction force to the steering column 71 which is coupled with the steering wheel 70. The resolver 75 detects the rotation angle of the EPS motor 74.

The EPS-ECU 76 is a device that controls the entire EPS unit 20, and similar to the assist ECU 18, includes as hardware components thereof an input/output unit, a computation unit, and a storage unit (none of which is shown).

<Detailed Configuration of Camera Group 22 and Sonar Group 24>

Figure 2:
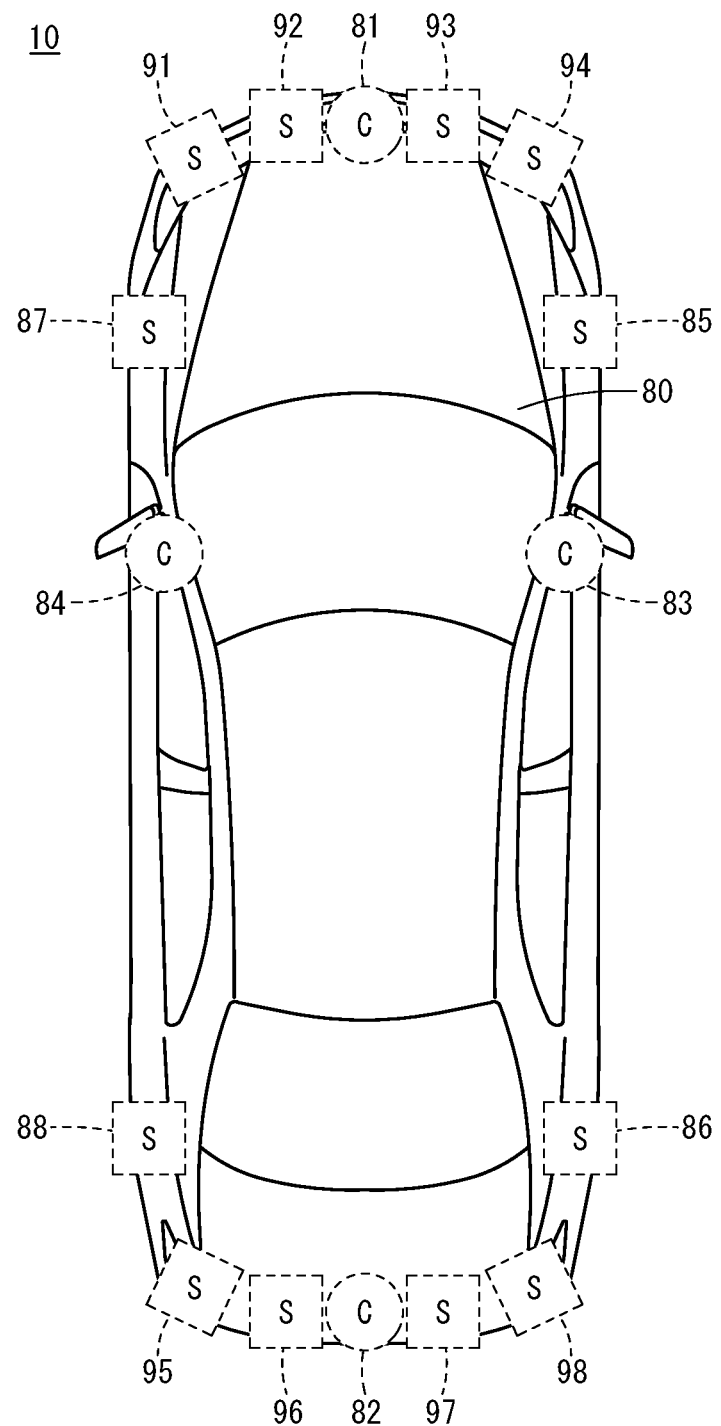
FIG. 2 is a general plan view showing an exemplary positioning of a camera group and a sonar group on the host vehicle of FIG. 1.

FIG. 2 is a schematic plan view showing an exemplary arrangement of the camera group 22 and the sonar group 24 on the host vehicle 10 of FIG. 1. For example, the camera group 22 is made up from four cameras: a front camera 81 at the front of a vehicle body 80, a rear camera 82 at the rear of the vehicle body 80, a right side camera 83 on a lower outer side of the driver's seat side door mirror, and a left side camera 84 on a lower outer side of the passenger seat side door mirror.

The sonar group 24 is constituted by two lateral sonars 85, 86 on the right lateral side of the vehicle body 80, two lateral sonars 87, 88 on the left lateral side, four front sonars 91, 92, 93, 94 at the front (front detection unit), and four rear sonars 95, 96, 97, 98 at the rear of the vehicle body 80 (rear detection unit). The lateral sonars 85 to 88 are disposed on, for example, the side faces of a front bumper, B-pillars, or side sill garnishes.

The front sonars 92, 93 and the rear sonars 96, 97 are each disposed at a position close to the center line of the vehicle body 80 and are at an orientation that coincide with the vehicle longitudinal direction. The front sonars 91, 94 and the rear sonars 95, 98 are each disposed at a position far from the center line of the vehicle body 80 and are at an orientation inclined outward with respect to the vehicle longitudinal direction.

Figure 3:
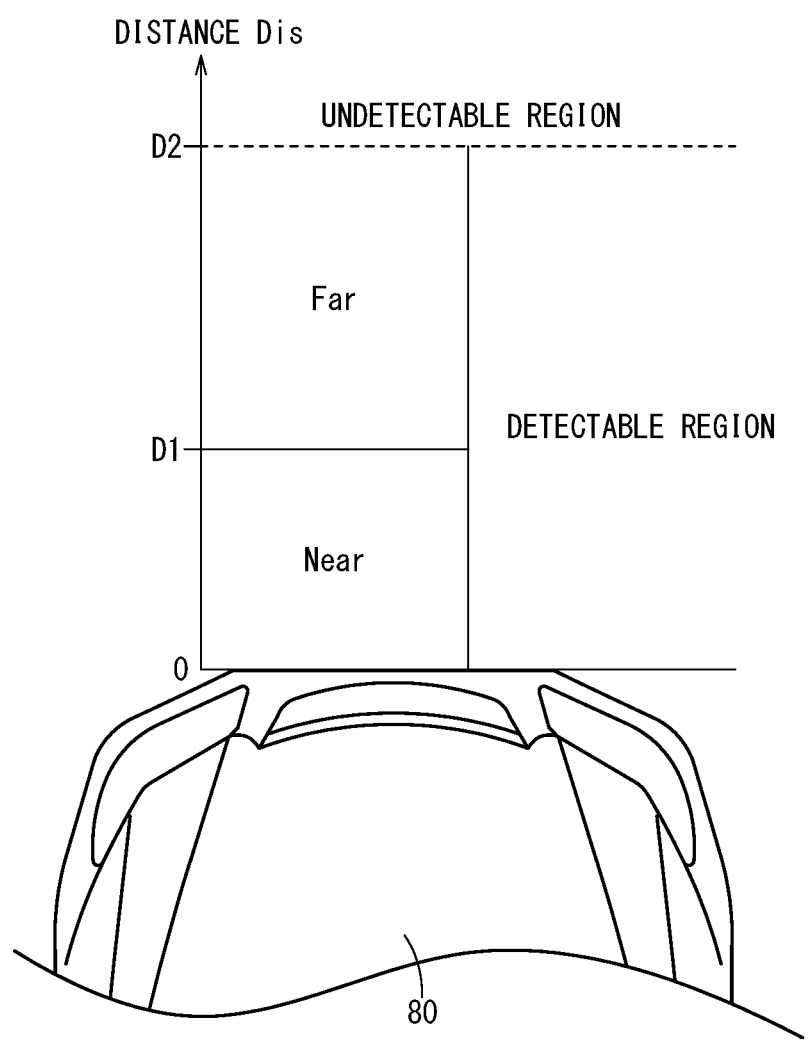
FIG. 3 is a schematic diagram showing results of detection by the front sonars of FIG. 2.

FIG. 3 is a schematic diagram showing results of detection by the front sonars 91 to 94 of FIG. 2. This diagram is an illustration of the front sonars 92, 93, which are disposed at orientations coinciding with the vehicle longitudinal direction of the vehicle body 80.

The assist ECU 18 (computation unit 52) performs a detection process by classifying the distance Dis into three distance regions depending on the distance Dis from the front sonars 91 to 94. For example, if another object can be detected within a distance region that satisfies the inequality $0<Dis\leq D2$, such a distance region is defined as "detection capable region". On the other hand, if another object cannot be detected in a distance region that satisfies the inequality $Dis>D2$, such a distance region is defined as "detection incapable region".

In the present example, the detection capable region mentioned above is further classified into two distance regions. Specifically, when a distance region satisfies the inequality $0<Dis\leq D1$ ($<D2$), such a distance region is defined as "near" (or a "near region"). When a distance region satisfies the inequality $D1<Dis$ ($\leq D2$), such a distance region is defined as "far" (or a "far region").

[Operation of Parking Exit Assist Device 12]

<Overview of Parking Exit Assist Control>

The parking exit assist device 12 according to this embodiment is configured as described above. Responsive to an input operation of the driver via the navigation device 16 (FIG. 1), the parking exit assist device 12 transitions into a "parking exit assist control mode", as will be discussed later with reference to FIG. 5, and starts the parking exit assist control for the host vehicle 10. The navigation device 16 provides guidance output (referred to simply as "guidance" hereinafter) relating to the parking exit assist during execution of parking exit assist control. Specifically, in accordance with the output control by the output control unit 62, visual information (a screen) relating to parking exit assist is output to the touch panel display 40 and together therewith, audio information relating to the parking exit assist is output to the speaker 42.

Figure 4:
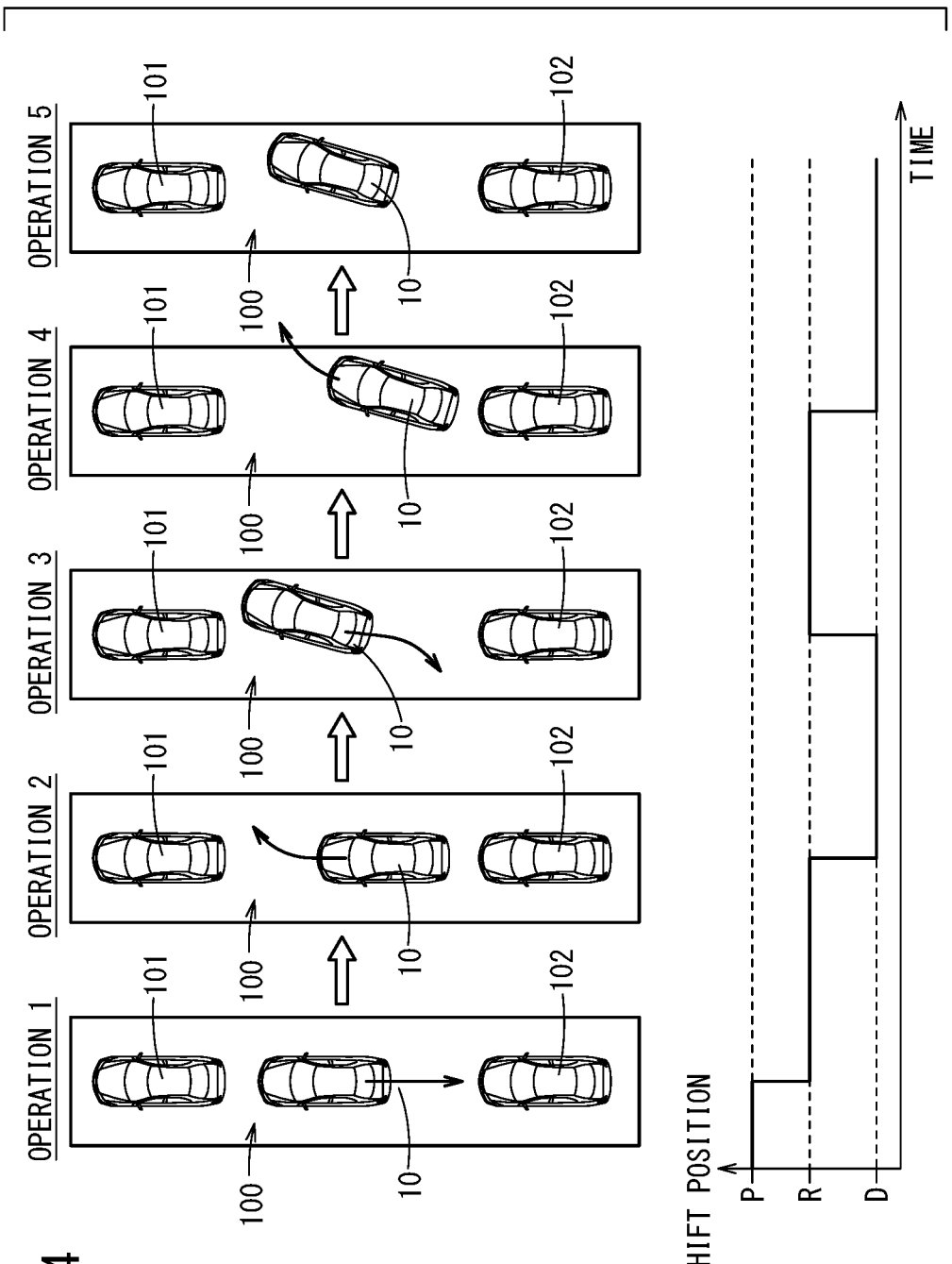
FIG. 4 is a schematic diagram showing a sequence of operations of the host vehicle under pull-out assist control.

FIG. 4 is a schematic diagram showing a series of operations of the host vehicle 10 in accordance with the parking exit assist control. The present example assumes a case where another front vehicle 101 (a front obstacle), the host vehicle 10, another rear vehicle 102 (a rear obstacle) are parked in a row within a parallel parking space 100.

In "Operation 1", the assist ECU 18 supplies the navigation device 16 with an output signal in order to carry out a rearward operation (a departure command and a stop command) of the host vehicle 10. In accordance with the guidance provided by the navigation device 16, the driver operates the shift lever 32 to change the shift position from "P" to "R" and then releases the brake pedal. Here, the steering angle $\theta$ is set to a neutral angle $\theta o$ (=0 degrees), so the host vehicle 10 moves straight backward under the action of a creep force. Triggered by detection of "near" by the rear sonars 95 to 98, the driver performs an operation of pressing the brake pedal in accordance with the guidance provided by the navigation device 16.

In "Operation 2", the assist ECU 18 supplies the navigation device 16 with an output signal in order to carry out a forward operation (a departure command and a stop command) of the host vehicle 10. In accordance with the guidance provided by the navigation device 16, the driver operates the shift lever 32 to change the shift position from "R" to "D" and then releases the brake pedal. Here, the steering angle $\theta$ is set to a target steering angle $\theta tar$ (clockwise) by way of automatic steering, so the host vehicle 10 moves forward while turning to the right. Triggered by detection of "near" by the front sonars 91 to 94, the driver performs an operation of pressing the brake pedal in accordance with the guidance provided by the navigation device 16.

In "Operation 3", the assist ECU 18 supplies the navigation device 16 with an output signal in order to carry out a rearward operation (a departure command and a stop command) of the host vehicle 10. In accordance with the guidance provided by the navigation device 16, the driver operates the shift lever 32 to change the shift position from "D" to "R" and then releases the brake pedal. Here, the steering angle θ is set to the target steering angle θtar (counterclockwise) by way of automatic steering, so the host vehicle 10 moves backward while turning to the left. Triggered by detection of "near" by the rear sonars 95 to 98, the driver performs an operation of pressing the brake pedal in accordance with the guidance provided by the navigation device 16.

In "Operation 4", the assist ECU 18 supplies the navigation device 16 with an output signal in order to carry out a forward operation (a departure command and a stop command) of the host vehicle 10. In accordance with guidance provided by the navigation device 16, the driver operates the shift lever 32 to change the shift position from "R" to "D" and then releases the brake pedal. Here, the steering angle θ is set to the target steering angle θtar (clockwise) by way of automatic steering, so the host vehicle 10 moves forward while turning to the right. The host vehicle 10 reaches an assist ending position without detection of "near" by the front sonars 91 to 94.

In "Operation 5", the driver receives the notification (termination of parking exit assist) issued by the navigation device and recognizes that the responsibility for driving has been handed over to the driver him/herself. The driver departs from the parallel parking space 100 by pressing the accelerator pedal, whereby the parking exit operation of the host vehicle 10 is completed.

<State Transition Diagram>

Figure 5:
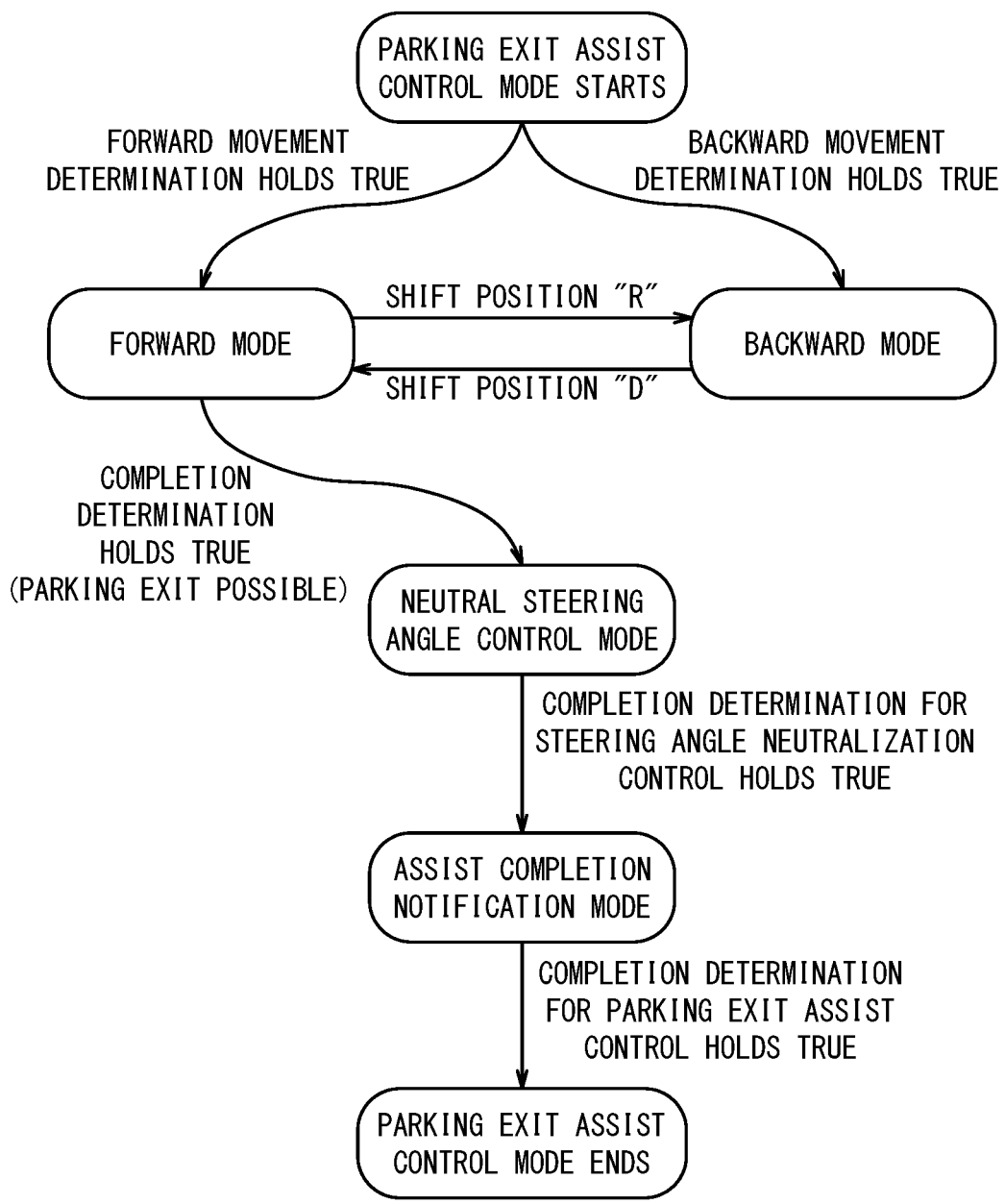
FIG. 5 is a state transition diagram of a pull-out assist control mode.

FIG. 5 is a state transition diagram of the parking exit assist control mode. The parking exit assist control mode is basically made up from four modes: [1] a forward traveling mode, [2] a rearward traveling mode, [3] a neutral steering angle control mode, and [4] an assist completion notification mode.

First, accompanying the occurrence of the event of the "parking exit assist control mode", a transition is made to either one of the "forward traveling mode" or the "rearward traveling mode". Although this parking exit assist control basically starts from the "rearward traveling mode", the process exceptionally transitions to the "forward traveling mode" judging that a forward traveling determination is satisfied when there is an obstacle in close proximity to the rear of the host vehicle 10 and "near" is detected by one or more of the rear sonars 95 to 98.

For example, after having transitioned to the "rearward traveling mode", the "rearward traveling mode" is maintained until the shift position is changed from "R" to "D". On the other hand, if the shift position is changed from "R" to "D" during execution of the "rearward traveling mode", a transition is made from the "rearward traveling mode" to the "forward traveling mode".

For example, after having transitioned to the "forward traveling mode", the "forward traveling mode" is maintained until either the shift position is changed from "D" to "R" or until a later-described completion determination (a "exiting from parking is possible" determination) is satisfied. If the shift position is changed to "R" during execution of the "forward traveling mode", a transition is made from the "forward traveling mode" to the "rearward traveling mode".

Here, as an example of a determination condition that results in "exiting from parking is possible", there is a case where both the two front sonars 92, 93 located on the center side indicate "detection incapable" and neither of the two front sonars 91, 94 located on the corner sides indicate "near" (that is, "far" or "detection incapable").

If the completion determination of the "forward traveling mode" is satisfied, a transition is made from the "forward traveling mode" to the "neutral steering angle control mode". After the transition, the "neutral steering angle control mode" is maintained until a later-described completion determination of steering angle neutralization control is satisfied.

If completion determination for the "neutral steering angle control mode" is satisfied, a transition is made from the "neutral steering angle control mode" to the "assist completion notification mode". After the transition, the "assist completion notification mode" is maintained until the completion determination of the parking exit assist control is satisfied. On the other hand, when the completion determination of the "assist completion notification mode" is satisfied, the event of the "parking exit assist control mode" ends.

<Operations during Forward Traveling Mode>

Figure 6:
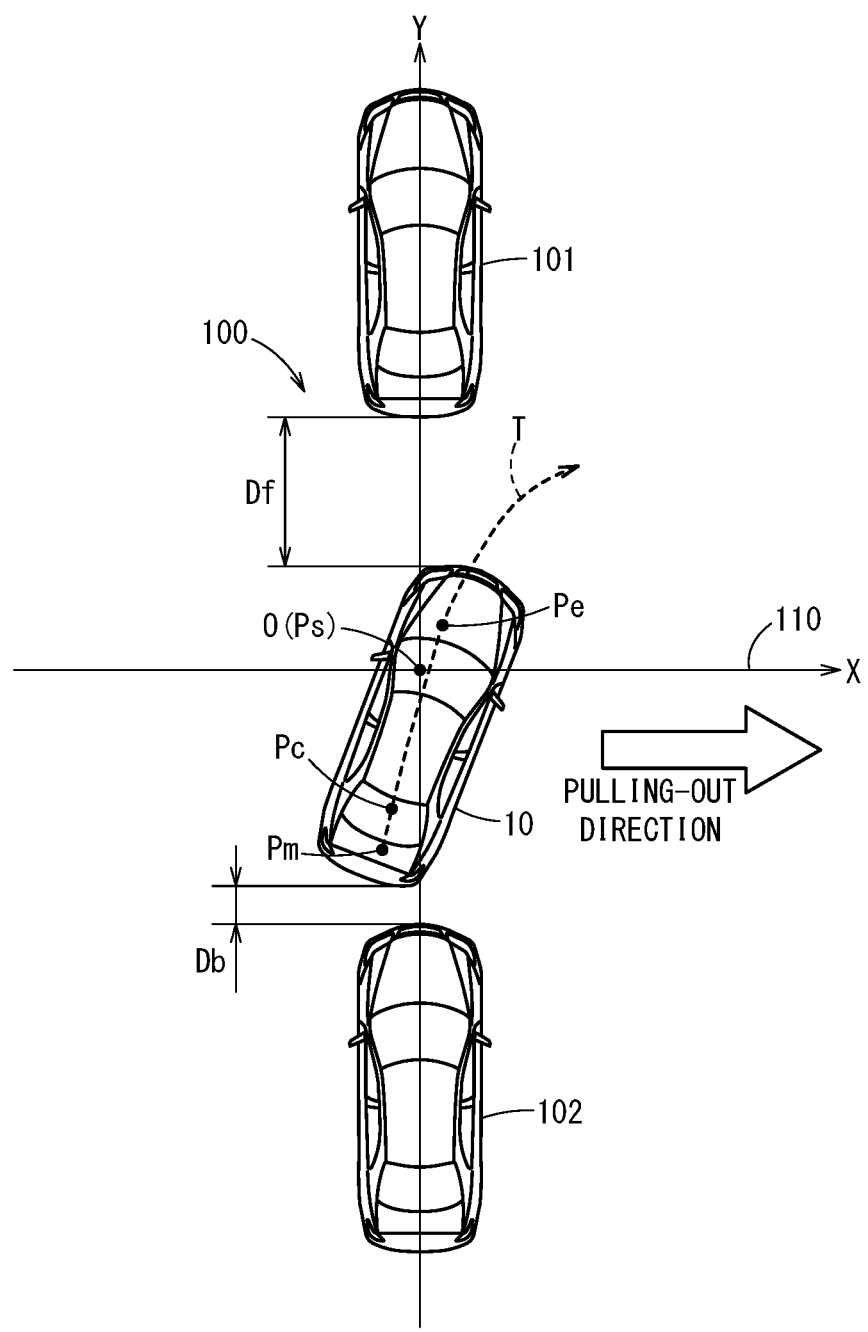
FIG. 6 is a schematic diagram showing how a pull-out track is set.
Figure 7:
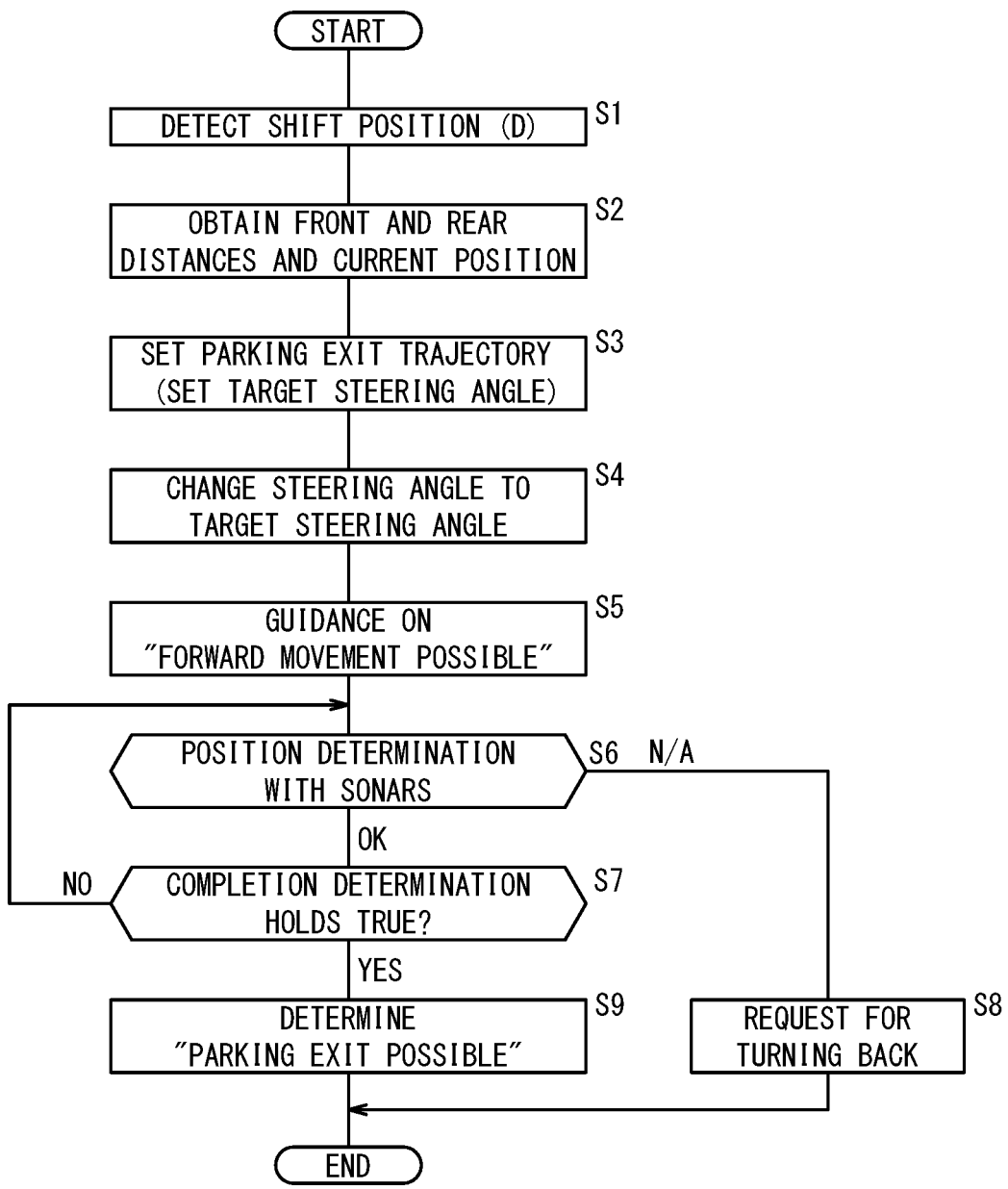
FIG. 7 is a flowchart for reference in describing the operation of the parking exit assist device in the "forward mode" shown in FIG. 5.

Next, the operation of the parking exit assist device 12 in the "forward traveling mode" of FIG. 5 is described in greater detail. FIG. 6 is a schematic diagram showing how the exit-from-parking trajectory T is set. FIG. 7 is a flowchart in which there is shown in detail an explanation of operations of the parking exit assist device 12 in the "forward traveling mode".

As shown in FIG. 6, a case is assumed where the host vehicle 10 exits from the parallel parking space 100 while maintaining certain distances with respect to the front other vehicle 101 and the rear vehicle 102. An exit-from-parking coordinate system 110 is defined by a state of the host vehicle 10 at a time when the parking exit assist control is started. Specifically, the X-axis is an axis parallel to the vehicle traverse direction of the host vehicle 10 and the Y-axis is an axis parallel to the vehicle longitudinal direction of the host vehicle 10. The position of the host vehicle 10 (hereinafter "assist starting position Ps") is set as an origin O of the exit-from-parking coordinate system 110. The pulling-out direction of the host vehicle 10 is the positive direction on the X-axis and is a direction in which the host vehicle 10 intends to travel (pull out) relative to the assist starting position Ps.

Hereinafter, the current position of the host vehicle position will be referred to as a current position Pc of the host vehicle 10. For example, at the current position Pc, the distance between the host vehicle 10 and the front vehicle 101 (hereinafter "a frontward distance Df") is detected by the front sonar 91. Also, at the current position Pc, a distance Db between the host vehicle 10 and the rear vehicle 102 (hereinafter "backward distance") is detected by the rear sonar 98.

Here, every time a turning back operation of the host vehicle 10 occurs, the parking exit assist device 12 (specifically, the assist ECU 18) identifies a stopped position of the host vehicle 10 (hereinafter "an intermediate position Pm"), and calculates and sets the exit-from-parking trajectory T which passes through the intermediate position Pm. The exit-from-parking trajectory T is a trajectory (a curve or a straight line) through which the host vehicle 10 can pass keeping the steering angle θ at the target steering angle θtar.

On the exit-from-parking trajectory T, there are the intermediate position Pm corresponding to a starting point and the exit-from-parking ending position Pe corresponding to an ending point. Here, the exit-from-parking ending position Pe is a position at which the host vehicle 10 is actually determined to be capable of exiting from parking or a reference position for finally determining whether the host vehicle 10 can exit from parking.

The flowchart of FIG. 7 shows principal operations from the start of "forward traveling mode" to the end of the "forward traveling mode". After completion of the flowchart, if a determination result indicating that the exit from parking is possible is obtained, a transition is made to the "neutral steering angle control mode" whereas if the determination result indicating that the exit from parking is impossible is obtained, a transition is made to the "a rearward traveling mode".

At step S1, the assist ECU 18 determines from a detection signal provided by the shift position sensor 30 that the shift position of the shift lever 32 is "D" and starts the "forward traveling mode". At this point in time, the host vehicle 10 is stopped at the intermediate position Pm shown in FIG. 6.

At step S2, the assist ECU 18 (the exit-from-parking trajectory setting unit 56) obtains various kinds of information indicative of a positional relationship with obstacles in the vicinity of the host vehicle 10. Specifically, the front sonars 91 to 94 each detect the frontward distance Df between the host vehicle 10 and the front vehicle 101. Also, the rear sonars 95 to 98 each detect the backward distance Db between the host vehicle 10 and the rear vehicle 102.

In addition to the frontward distance Df and the backward distance Db, the assist ECU 18 determines the current position Pc, or in other words, the latest intermediate position Pm, in the predefined exit-from-parking coordinate system 110. For example, the current position Pc can be calculated by tracking the actual movement trajectory from the most recent intermediate position Pm (or the assist starting position Ps). The movement trajectory is calculated by using the starting point and the shape of the most recently set exit-from-parking trajectory T as well as the travel distance of the host vehicle 10.

At step S3, the exit-from-parking trajectory setting unit 56 sets the exit-from-parking trajectory T for the host vehicle 10 using the frontward distance Df, the rearward distance Db, and the intermediate position Pm which were obtained at step S2. Specifically, the exit-from-parking trajectory setting unit 56 sets a target steering angle θtar suitable for the current vehicle state or the surrounding situations and an exit-from-parking trajectory T (shown as a broken line in the diagram) that passes through the latest intermediate position Pm.

At step S4, the assist control unit 60 changes the current steering angle θ of the host vehicle 10 (the most recently set steering angle before the turning back operation at the intermediate position Pm) to the target steering angle θtar that was set at step S3. Specifically, the assist control unit 60 supplies the EPS-ECU 76 with a control signal in order to instruct that a change be made to the target steering angle θtar. As a result, automatic steering takes place while the host vehicle 10 is stopped at the intermediate position Pm.

At step S5, the output control unit 62 supplies the navigation device 16 with an output signal indicating that the host vehicle 10 is able to move forward. When the driver performs an operation of releasing the brake pedal in accordance with the guidance provided by the navigation device 16, the host vehicle 10 moves forward along the exit-from-parking trajectory T under the action of a creep force.

At step S6, the assist continuation determination unit 58 performs a position determination with the front sonars 91 to 94. Specifically, it determines whether at least one of the front sonars 91 to 94 has detected "near". If it is determined that none has detected "near" (step S6: OK), the flow proceeds to the next step (S7).

At step S7, the assist continuation determination unit 58 determines whether the completion determination of the exit-from-parking assist control is satisfied. One of the conditions that make up this completion determination is that the front vehicle 101 or some other obstacle ceases to be detected by the front sonars 91 to 94. If the end of assist position Pe has not been reached yet (step S7: NO), the flow returns to step S6 and then the determinations at steps S6 and S7 are repeatedly performed.

If it is determined that at least one of the front sonars 91 to 94 has detected "near" at step S6 (step S6: N/A), the flow proceeds to step S8.

At step S8, the assist continuation determination unit 58 determines that the host vehicle 10 cannot exit from parking while maintaining the exit-from-parking trajectory T, and requests a turning back operation of the host vehicle 10 with respect to the assist control unit 60. After receiving the request for turning back from the assist continuation determination unit 58, the assist ECU 18 ends the "forward traveling mode" on the condition that the shift position of the shift lever 32 switches to "R".

If the completion determination for the exit-from-parking assist control is satisfied at step S7 (step S7: YES), the flow proceeds to step S9.

At step S9, the assist continuation determination unit 58 determines, based on the results of detection by the front sonars 91 to 94, that the front vehicle 101 or some other obstacle is not currently present on the exit-from-parking trajectory T and the host vehicle 10 moving forward can pull out from the parking space without performing the turning back operation (that is, the host vehicle 10 can exit from parking). Then, in response to the determination of the pull-out being possible by the assist continuation determination unit 58, the assist ECU 18 ends the "forward traveling mode".

In this manner, the "forward traveling mode" ends. Here, when it is determined that "exiting from parking is impossible" (step S8), the assist ECU 18 shifts from the "forward traveling mode" to the "rearward traveling mode". When it is determined that "exiting from parking is possible" (step S9), the assist ECU 18 shifts from the "forward traveling mode" to the "neutral steering angle control mode".

The "rearward traveling mode" shown in FIG. 5 is also basically executed according to the same procedures shown in the flowchart of FIG. 7. However, the "rearward traveling mode" is different in that [1] the shift position is "R" (step S1), [2] the direction of travel of the host vehicle 10 is opposite (backward movement) (step S5), and [3] results of detection by the rear sonars 95 to 98 are used (step S6).

<Operation of Steering Angle Neutralization Control>

Next, the operation of the steering angle neutralization control executed in the "neutral steering angle control mode" shown in FIG. 5 is described in greater detail. Here, the "steering angle neutralization control" means a steering angle control in which the steering angle θ that is set to the target steering angle θtar is changed and brought into proximity to the neutral angle θo. This control is performed by the assist control unit 60.

Figure 8:
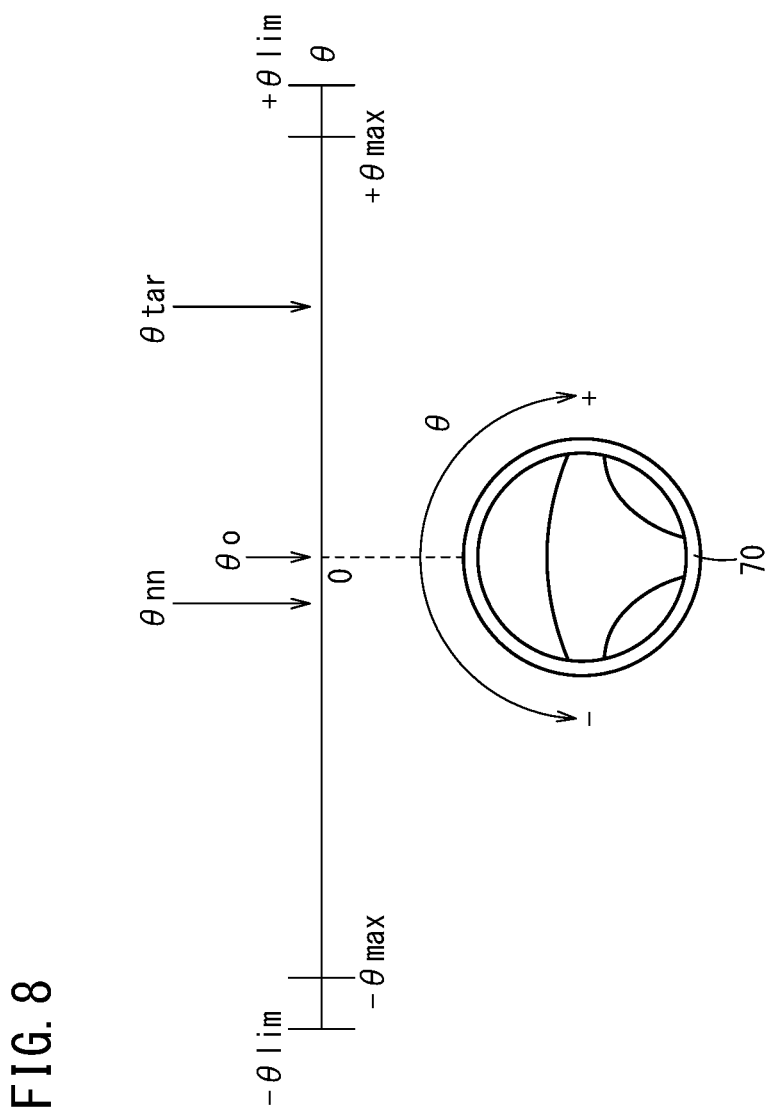
FIG. 8 is a schematic diagram illustrating parameters associated with the steering angle of the steering wheel of FIG. 1.

FIG. 8 is a schematic diagram for explaining parameters associated with the steering angle of the steering wheel 70 of FIG. 1. For the sake of description, this diagram (FIG. 8) and FIGS. 9 to 12B show a movable range of the steering angle (that is, steering angle θ) of the steering wheel 70 as a linear graph. The steering angle θ is defined with the clockwise direction being the positive direction and the counterclockwise direction being the negative direction, with respect to the neutral angle θo (=0 degrees). Hereinafter, an angle in the vicinity of the neutral angle θo (approximately from −60 degrees to +60 degrees) will be called a "neutral neighboring angle θnn".

Here, a limit angle θlim is a maximum steering angle (in the positive direction and the negative direction) by which the steering wheel can be steered owing to the configuration of the steering mechanism. The target steering angle θtar is a steering angle that can be arbitrarily set within a range in which a controlled maximum angle θmax serves as an upper limit (that is, 0≤|θ|≤θtar). The controlled maximum angle θmax is set to a value slightly smaller than the limit angle θlim (for example, equivalent to 95% of the limit angle θlim). Setting of the controlled maximum angle θmax in this manner is for the purpose of suppressing operating noises of the steering mechanism, which are likely to occur by setting of the limit angle θlim, and in order to leave a margin with respect to overshooting of steering.

FIRST EXAMPLE

Figure 9:
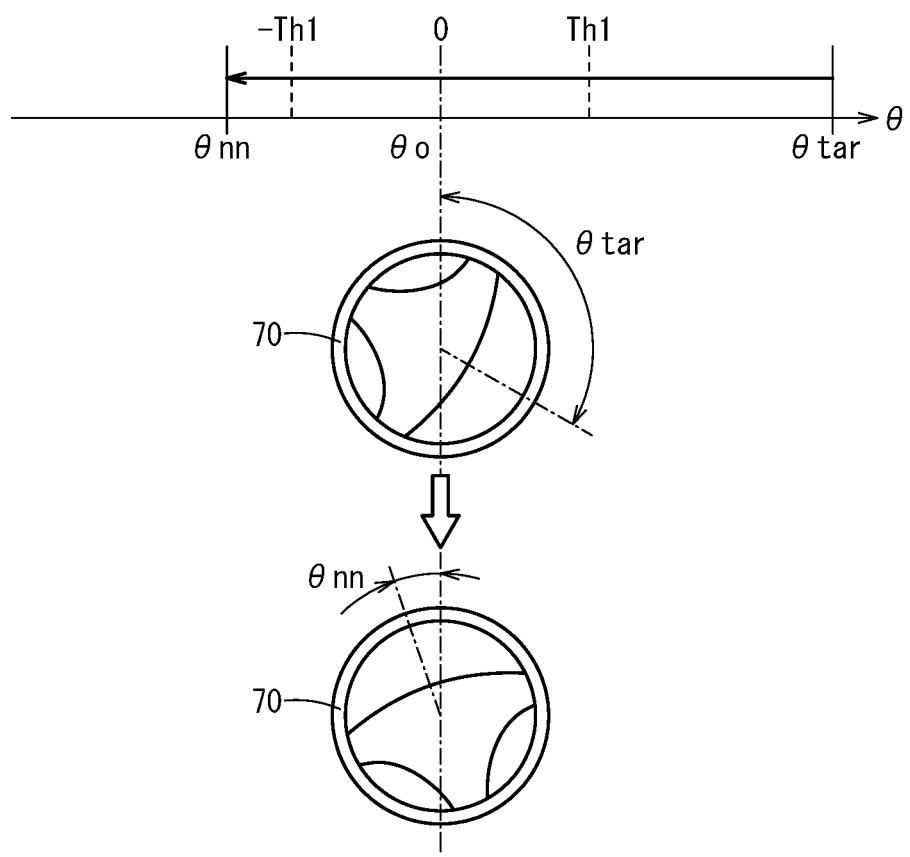
FIG. 9 is a diagram showing a first example of steering angle neutralization control.

FIG. 9 is a diagram showing a first example of steering angle neutralization control. For the sake of illustration, only part of a graph showing the movable range of the steering angle θ is described. This also applies to FIGS. 10 to 12 discussed below.

A first threshold Th1 is a positive threshold (for example, 10 degrees) that is set in accordance with the type of the host vehicle 10, satisfying a magnitude relation of Th1<|θnn|. When a difference between the target steering angle θtar and the neutral angle θo exceeds the first threshold Th1 (that is, when the inequality |θtar|>Th1 is satisfied), the steering angle θ of the host vehicle 10 is changed from the target steering angle θtar to the neutral neighboring angle θnn.

Particularly when the steering angle θ of the host vehicle 10 is an angle that is inclined on one side relative to the neutral angle θo (for example, θ>0 [degrees]), the assist control unit 60 may perform assist control to change the steering angle θ of the host vehicle 10 to a neutral neighboring angle that is inclined on the other side relative to the neutral angle θo (θnn<0 [degrees]). Given a return of the steering angle that can be caused by elastic deformation of tires or by backlash of the steering mechanism, the steering angle θ after being returned to the one side can be brought closer in proximity to the neutral angle θo.

SECOND EXAMPLE

Figure 10:
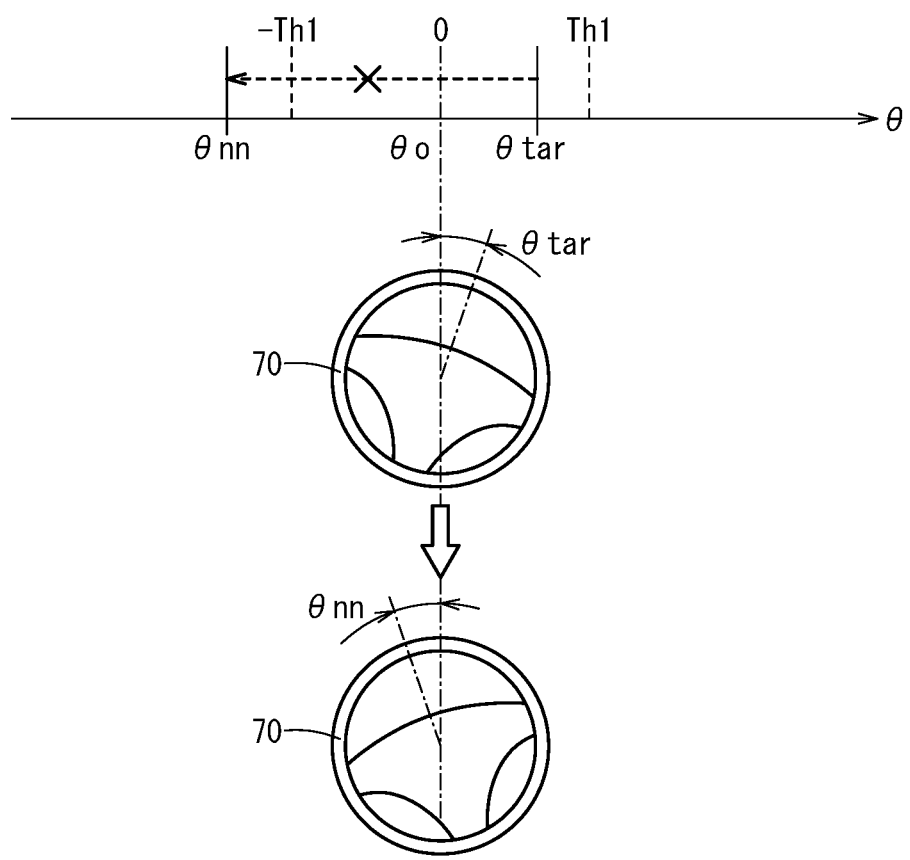
FIG. 10 is a diagram showing a second example of steering angle neutralization control.

FIG. 10 is a diagram showing a second example of steering angle neutralization control. This diagram shows a case where a difference between the target steering angle θtar and the neutral angle θo is equal to or smaller than the first threshold Th1 (that is, when the inequality |θtar|≤Th1 is satisfied). In this situation, the steering angle θ of the host vehicle 10 remains the target steering angle θtar without being changed to the neutral neighboring angle θnn.

In this manner, when the difference between the target steering angle θtar and the neutral angle θo is equal to or smaller than the first threshold Th1, the assist control unit 60 may perform an assist control that does not change the steering angle θ of the host vehicle 10. A situation can be avoided where the steering angle θ only moves away from the neutral angle θo as a result of changing the steering angle θ.

THIRD EXAMPLE

Figure 11:
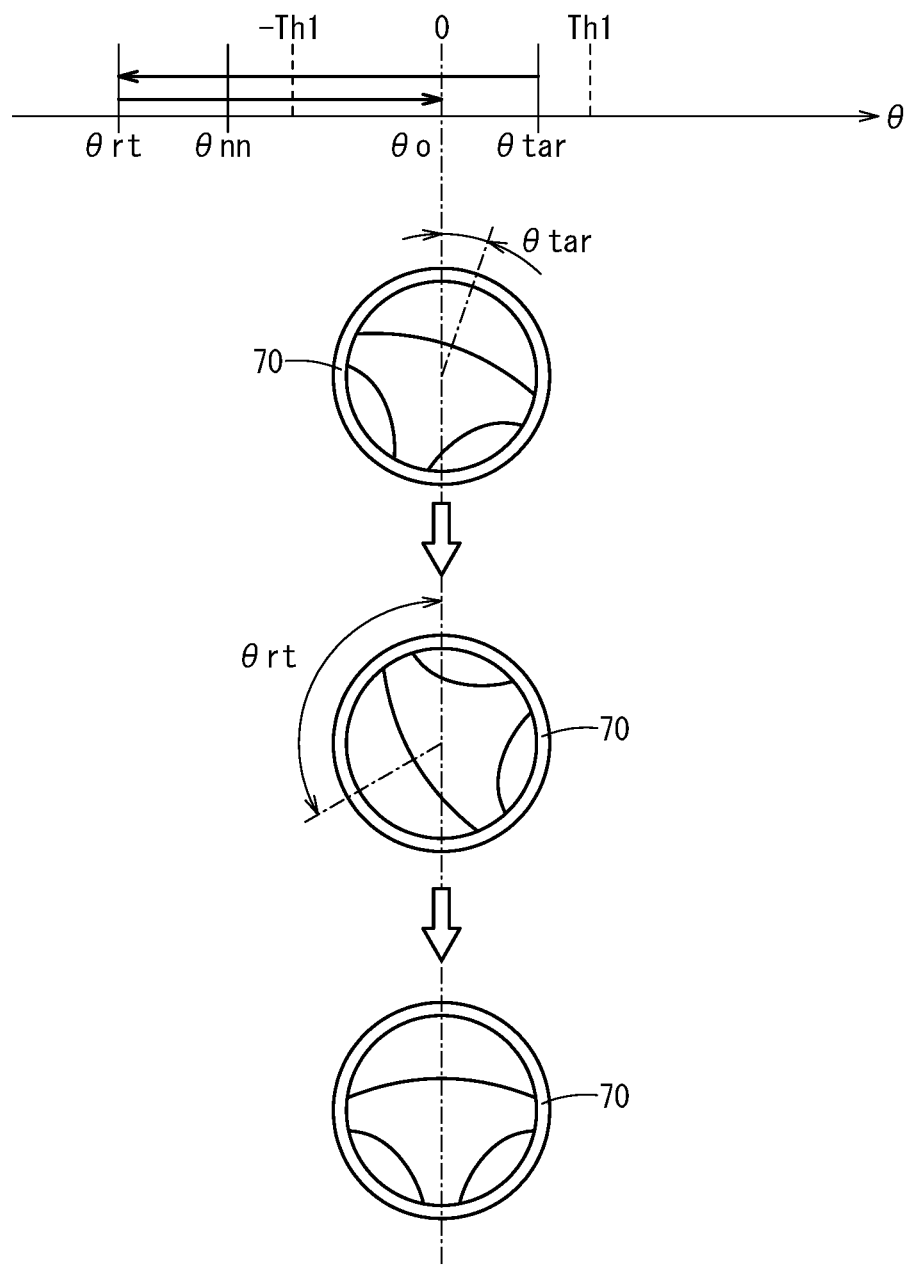
FIG. 11 is a diagram showing a third example of steering angle neutralization control.

FIG. 11 is a diagram showing a third example of steering angle neutralization control. This diagram shows a case where a difference between the target steering angle θtar and the neutral angle θo is equal to or smaller than the first threshold Th1 (that is, when the inequality |θtar|≤Th1 is satisfied). In this situation, the steering angle θ of the host vehicle 10 is changed from the target steering angle θtar to an angle (hereinafter "return angle θrt") that exceeds the neutral neighboring angle θnn by a predetermined angle and thereafter changed from the return angle θrt to the neutral angle θo.

Preferably, the return angle θrt is within a range that allows the driver to have a sense of operation of the steering wheel 70, specifically, 90 [degrees]≤|θrt|≤180 [degrees].

In this manner, when the difference between the target steering angle θtar and the neutral angle θo is equal to or smaller than the first threshold Th1, the assist control unit 60 may perform an assist control in which the steering angle θ of the host vehicle 10 is controlled to overshoot relative to the neutral neighboring angle θnn from the target steering angle θtar under automatic steering of the steering wheel 70 and then change the steering angle θ to the neutral angle θo.

Even when the steering angle θ is set to a target steering angle θtar that is close to the neutral angle θo, by presenting the driver with a series of moves of turning back the steering wheel 70 to the neutral angle θo (a so-called "ending routine"), it is possible to enhance the representation effect that indicates the end of the assist control.

FOURTH EXAMPLE

Figure 12A:
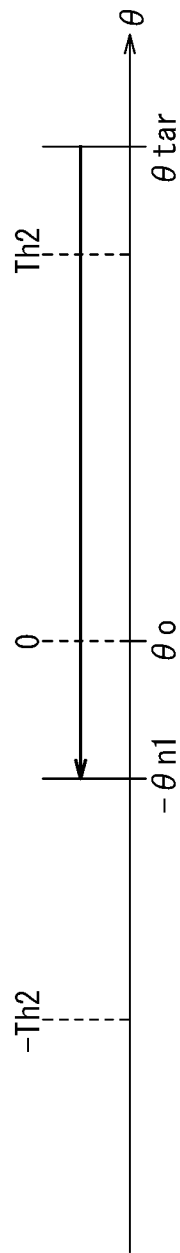
FIGS. 12A and 12B are diagrams showing a fourth example of steering angle neutralization control.
Figure 12B:
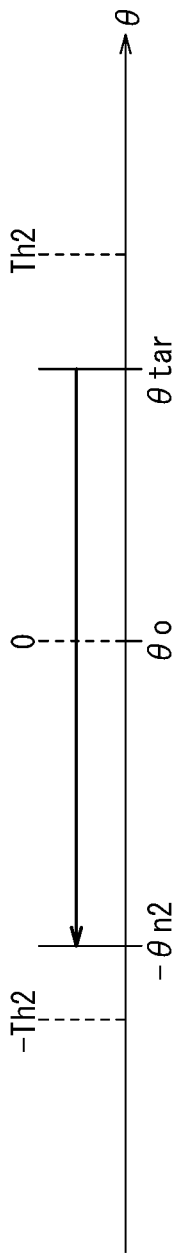

FIGS. 12A and 12B are diagrams showing a fourth example of steering angle neutralization control. A second threshold Th2 is a positive threshold (for example, 30 degrees) that is set in accordance with the type of the host vehicle 10, satisfying a magnitude relation of Th2>|θnn|.

A case is thought about where, as shown in FIG. 12A, a difference between the target steering angle θtar and the neutral angle θo, namely |θtar|, is equal to or greater than the second threshold Th2. In this case, the steering angle θ of the host vehicle 10 is changed from the target steering angle θtar to a neutral neighboring angle −θn1 (θn1>0).

A case is thought about where, as shown in FIG. 12B, |θtar| is below the second threshold Th2 contrary to FIG. 12A. In this case, the steering angle θ of the host vehicle 10 is changed from the target steering angle θtar to a neutral neighboring angle −θn2 (θn2>0). Here, a magnitude relation of θn1<θn2 is satisfied.

In this manner, the assist control unit 60 may perform an assist control in which the steering angle θ is changed from the target steering angle θtar to a neutral neighboring angle (−θn1) that is small relative to the target steering angle when |θtar|≥Th2 is satisfied, whereas the steering angle θ is changed from the target steering angle θtar to a neutral neighboring angle (−θn2) that is large relative to the target steering angle when |θtar|<Th2 is satisfied. As a result, the amount of change of the steering angle becomes large relative to the target steering angle when the difference between the target steering angle θtar and the neutral angle θo is small, whereby the influence of backlash is lessened even if the backlash occurs.

FIFTH EXAMPLE

Figure 13:
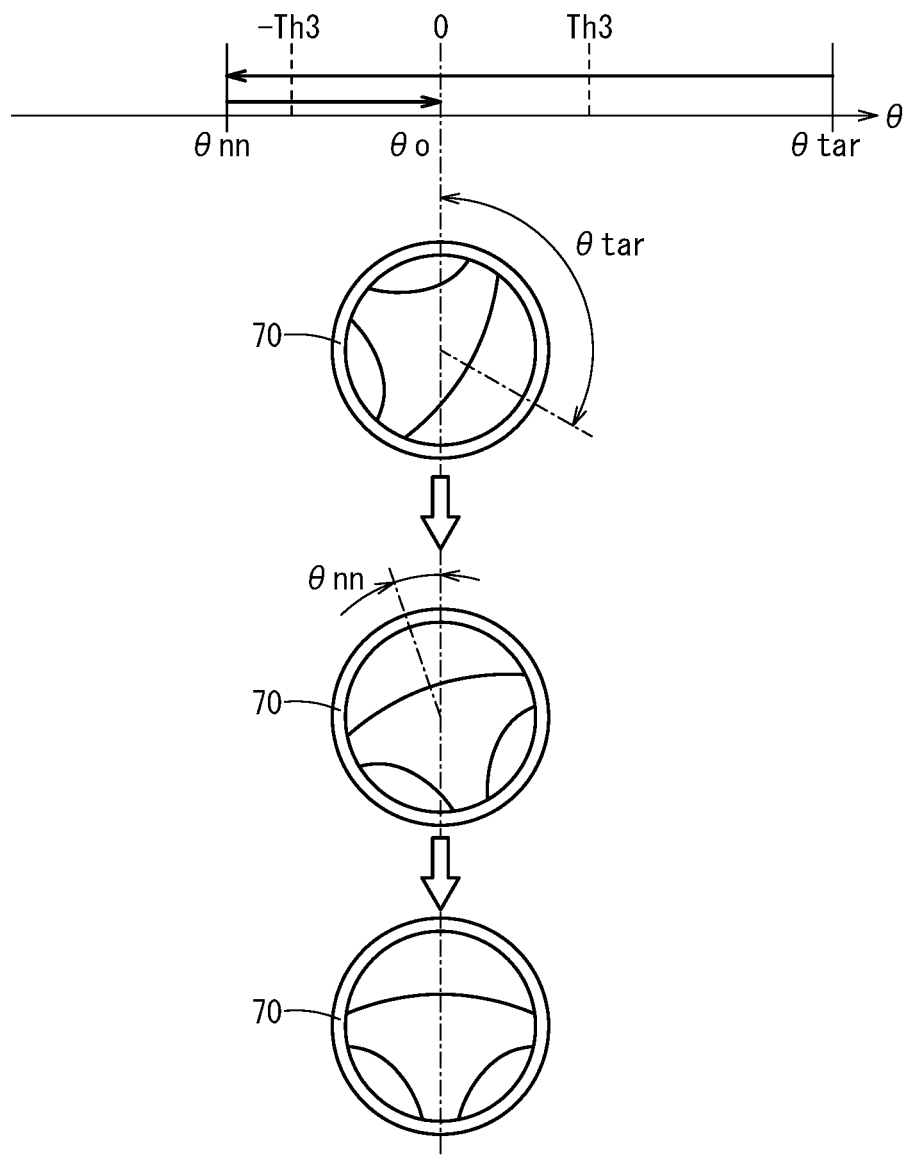
FIG. 13 is a diagram showing a fifth example of steering angle neutralization control.

FIG. 13 is a diagram showing a fifth example of steering angle neutralization control. A third threshold Th3 is a positive threshold (for example, 15 degrees) that is set in accordance with the type of the host vehicle 10, satisfying a magnitude relation of Th3<|θnn|. In this case, the steering angle θ of the host vehicle 10 is changed from the target steering angle θtar to the neutral neighboring angle θnn and then further changed to the neutral angle θo.

In this manner, when the neutral neighboring angle θnn is greater than the third threshold Th3, the assist control unit 60 may further perform assist control in which the steering angle θ of the host vehicle 10 is changed from the neutral neighboring angle θnn to the neutral angle θo. By additionally changing the steering angle θ in a direction matching the direction of backlash return, it is possible to return the steering angle θ to the neutral angle θo smoothly without causing the driver discomfort.

The first threshold Th1, the second threshold Th2, and the third threshold Th3 described above are thresholds that can be set independently from each other. It is particularly preferable that a magnitude relation of Th1<Th2≤Th3 or Th1<Th3<Th2, is satisfied.

SIXTH EXAMPLE

The "forward traveling mode" and the "neutral steering angle control mode" are distinguished as different modes in the state transition diagram shown in FIG. 5. However, the two modes may be handled in an integrated manner. Specifically, when a transition is made from the "rearward traveling mode" to the "forward traveling mode", the assist control unit 60 sets the target steering angle θtar in a direction corresponding to the exit direction (clockwise when the exit direction is a right direction). Then, after the transition to the "forward traveling mode", the assist control unit 60 controls the steering angle in accordance with a situation as the vehicle exits from parking while letting the host vehicle 10 travel. The assist control unit 60 may return the steering angle θ to the neutral angle θo or to the neutral neighboring angle θnn if it is determined that the exit from parking is possible.

In this manner, the assist control unit 60 may perform the steering angle neutralization control to change the steering angle θ (turn the wheel) while letting the host vehicle 10 travel. Due to the control, burden on the components of the EPS unit 20 can be reduced.

<Operation of Assist Completion Notification Mode>

After the steering angle θ of the host vehicle 10 is changed to the neutral angle θo or to the neutral neighboring angle θnn by the assist control unit 60, the driver of the host vehicle 10 may be notified through the touch panel display 40 and/or the speaker 42 that the host vehicle 10 can exit from parking. This enables the driver to recognize in a timely manner that the responsibility for driving has been handed over to the driver.

[Effects of Parking Exit Assist Device 12]

As has been described, the parking exit assist device 12 includes [1] the front sonars 91 to 94 that detect at least the frontward distance Df from the host vehicle 10 to the front vehicle 101 in front of the host vehicle 10, [2] the exit-from-parking trajectory setting unit 56 that sets the target steering angle θtar of the host vehicle 10 using the detected front distance Df and the position of the host vehicle 10, [3] the assist control unit 60 that carries out the assist control in which the steering angle θ of the host vehicle 10 is changed to the target steering angle θtar, and [4] the assist continuation determination unit 58 that determines whether the exit of the host vehicle 10 from parking is possible or not based on results of detection of the front vehicle 101 by the front sonars 91 to 94. Then, [5] when it is determined that the exit of the host vehicle 10 from parking is possible, the assist control unit 60 performs the assist control in which the steering angle θ of the host vehicle 10 is changed from the target steering angle θtar to the neutral angle θo or to the neutral neighboring angle θnn.

In this manner, when it is determined that the exit of the host vehicle 10 from parking is possible, the assist control unit in which the steering angle θ of the host vehicle 10 is changed from the target steering angle θtar to the neutral angle θo or to the neutral neighboring angle θnn is performed. As a result, the driver can start driving from a steering angle that can be easily perceived as an initial state after completion of the exit from parking (that is, the neutral angle θo or the neutral neighboring angle θnn). Thus, the driver can correctly recognize the vehicle state after the assist control has ended and the responsibility for driving has been transferred to the driver, and together therewith it can be made certain that there is a sufficient safety of driving after the host vehicle 10 exits from parking.

FIG. 14 is a diagram showing the behavior of the host vehicle 10 exiting from parking after the execution of the steering angle neutralization control. The host vehicle 10 intends to exit from the parallel parking space 100 and enter one driving lane 113. Here, the host vehicle 10 starts moving forward in a state of being substantially at the neutral steering angle (the neutral angle θo or the neutral neighboring angle θnn). The driver moves the host vehicle 10 straight a little and then steers the steering wheel 70 counterclockwise. This allows the host vehicle 10 to enter the lane smoothly while the host vehicle 10 is prevented from crossing over a white broken line 114, driving into an opposite lane 115, or colliding with the parked front vehicle 101.

After the exit-from-parking assist control is terminated and the responsibility for driving is transferred to the driver, a situation may occur where the driver is not correctly aware of the vehicle state or the surrounding environment after the exit from parking is complete. In this case, the driver may steer the steering wheel 70 counterclockwise shortly after starting moving forward, whereby the host vehicle 10 may collide with the front vehicle 101.

Thus, if the front vehicle 101 is detected by the lateral sonars 85 to 88 (in this example, the left lateral sonars 87, 88), the driver of the host vehicle 10 may be notified that a collision on the side of the host vehicle 10 is imminent using the touch panel display 40 and/or the speaker 42. The driver thereby can correct the operation of the steering wheel 70 so that the host vehicle 10 does not collide with the front vehicle 101.

[Supplementary Note]

The present invention is not limited to the above-described embodiment but may be freely subjected to modifications without departing from the scope of the invention.

Although the above embodiment was described taking automatic steering as an example, the present invention may adopt various driving modes in which automatic and manual operations of the accelerator pedal (not shown), the brake pedal (not shown), and the shift lever 32 are combined.

For example, in a case where steering of the steering wheel 70, operations to change the shift position, or operations of the brake pedal have been automatically performed during the exit-from-parking assist control by the assist control unit 60, all or some of the operations may be handed over to the driver after the exit-from-parking assist control has ended.

According to the above embodiment, an exemplary case has been presented and described in which the steering angle of the steering wheel 70 is changed. However, instead of the steering angle θ, another physical quantity or controlled quantity associated with the steering of the host vehicle 10 may be used. For example, the steering angle θ may be a turning angle or a toe angle of the wheels or may be a steering angle command value defined within the EPS-ECU 76.

According to the above embodiment, a configuration is adopted in which automatic steering of the steering wheel 70 is carried out. However, the means by which the steering angle θ is changed is not limited to this feature. For example, by the EPS-ECU 76 outputting a steer-by-wire command signal to a wheel turning mechanism, the steering angle θ in the form of a turning angle of the wheels may be changed. Alternatively, the steering angle θ in the form of a turning angle of the wheels may be changed by effecting a speed difference between the rotation speed of the inner wheels and the rotation speed of the outer wheels.

According to the above embodiment, although the sonars 91 to 98 are used as a means for detecting the frontward distance Df or the backward distance Db, the present invention is not limited to this configuration. The front detection unit (or rear detection unit) may instead be a distance measuring radar or a stereo camera, for example.

The invention claimed is:

1. A parking exit assist device comprising:
one or more processors configured to:
obtain information from at least one sensor disposed on a host vehicle and use the information to detect a front obstacle present in front of the host vehicle and at least a frontward distance from the host vehicle to the front obstacle;
set a target steering angle of the host vehicle using the frontward distance and a position of the host vehicle;
perform an assist control in which a steering angle of the host vehicle is changed to the target steering angle; and
determine whether exit of the host vehicle from parking is possible or not based on a result of detection of the front obstacle, wherein
when the exit of the host vehicle from the parking is determined to be possible, the one or more processors perform the assist control in which the steering angle of the host vehicle is changed from the target steering angle to a neutral angle or to a neutral neighboring angle within a predetermined range from the neutral angle at an end of the exit of the host vehicle from parking operation.

2. The parking exit assist device according to claim 1, wherein when the target steering angle is an angle inclined on one side with respect to the neutral angle, the one or more processors perform the assist control in which the steering angle of the host vehicle is changed from the target steering angle to the neutral neighboring angle inclined on another side with respect to the neutral angle.

3. The parking exit assist device according to claim 2, wherein when a difference between the target steering angle and the neutral angle is equal to or smaller than a first threshold, the one or more processors perform the assist control in which the steering angle of the host vehicle is not changed.

4. The parking exit assist device according to claim 2, wherein when a difference between the target steering angle and the neutral angle is equal to or smaller than a first threshold, using automatic steering of a steering wheel, the one or more processors perform the assist control in which the steering angle of the host vehicle is made to overshoot with respect to the neutral neighboring angle from the target steering angle and thereafter is changed to the neutral angle.

5. The parking exit assist device according to claim 2, wherein the one or more processors perform the assist control in which the steering angle of the host vehicle is changed from the target steering angle to a first neutral neighboring angle when a difference between the target steering angle and the neutral angle is equal to or greater than a second threshold, and the steering angle of the host vehicle is changed from the target steering angle to a second neutral neighboring angle when the difference between the target steering angle and the neutral angle is less the second threshold, and the second neutral neighboring angle is greater than the first neutral neighboring angle.

6. The parking exit assist device according to claim 1, wherein after changing the steering angle of the host vehicle to the neutral neighboring angle, when the neutral neighboring angle is larger than a third threshold, the one or more processors further perform the assist control in which the steering angle of the host vehicle is changed from the neutral neighboring angle to the neutral angle.

7. The parking exit assist device according to claim 1, wherein the one or more processors are further configure to, after the steering angle of the host vehicle has been changed to the neutral angle or to the neutral neighboring angle, notify a driver of the host vehicle that the exit of the host vehicle from the parking is possible.

* * * * *